United States Patent [19]

Harris

[11] Patent Number: 4,487,515

[45] Date of Patent: Dec. 11, 1984

[54] MULTIPLE ACTION PRINT HEAD CONTROL CIRCUIT FOR A DOT MATRIX PRINTER

[75] Inventor: Samuel C. Harris, Waynesboro, Va.

[73] Assignee: Genicom Corporation, Waynesboro, Va.

[21] Appl. No.: 399,216

[22] Filed: Jul. 19, 1982

[51] Int. Cl.³ .............................. B41J 3/12
[52] U.S. Cl. .............................. 400/121; 101/93.05; 400/124
[58] Field of Search .............. 400/121, 124, 320, 322, 400/323; 101/93.04, 93.05

[56] References Cited

U.S. PATENT DOCUMENTS

| | | | |
|---|---|---|---|
| 4,125,336 | 11/1978 | Chu | 400/124 |
| 4,167,342 | 9/1979 | Mower et al. | 400/124 |
| 4,326,813 | 4/1982 | Lomicka et al. | 400/124 |

Primary Examiner—Paul T. Sewell
Attorney, Agent, or Firm—Cushman, Darby & Cushman

[57] ABSTRACT

A dot matrix print head control circuit is capable of selectively requesting and receiving a predetermined set of print head control data from a digital data processor which successively transmits plural sets of such digital data and corresponding data acknowledge pulses in response to a data request signal. The microprocessor is thus enabled to independently control two print wire arrays in a dot matrix print head using identical circuits which are thus more economically formed as LSI chips. Each such identical print head control circuit has a "role determining" circuit which can be initialized such that its associated print head control circuit, although identically constructed, is capable of selecting a predetermined set (e.g. byte) of digital data from among the plural sets (e.g. bytes) of digital data transmitted in succession by the microprocessor. The identical print head control circuits are thus capable of effecting different print functions in response to the selectively received data set.

15 Claims, 5 Drawing Figures

MULTIPLE ACTION PRINT HEAD CONTROL CIRCUIT FOR A DOT MATRIX PRINTER,

The present invention is related to digital dot matrix printers and, more specifically, to control circuits therefor interfacing the printer with a data source such as a microprocessor or other data processing circuit.

This application is related to my copending commonly assigned U.S. patent application Ser. No. 399,129 filed July 16, 1982 (GE Docket No. 45-SL01376) and Ser. No. filed July 16, 1982 (GE Docket No. 45-SL-01377). The disclosure of both said related applications is hereby incorporated by reference.

Prior art dot matrix print head control systems designed to drive a wire matrix print head typically drive only one vertical wire array (e.g. a vertical linear array of nine wires, any eight of which may be selectively actuated at one time). Conventional logic circuits for such control may be advantageously placed on a single custom large scale integration (LSI) chip. Such a scheme works well when the print head contains only one vertical wire array, typically nine wires. However, in more complicated printers where it is desirable to obtain increased dot density by using a print head having more than one vertical wire array, the existing LSI chip is incapable of selectively receiving and otherwise handling the total data which must be fed to the wire drivers for the print head.

One solution is to provide a second custom LSI chip designed to handle those additional data receiving and handling functions which the first chip can not perform. This solution, although providing one possible answer to the problem, results in yet another chip which must be custom made to handle the additional functions. Further, in a typical printer the print head may sometimes be changed from a print head having two vertical wire arrays, (e.g. eighteen wires altogether), to a print head having a single wire array (e.g., only nine wires) and vice-versa. It would be highly desirable to use only one common type of circuit to drive each print head wire array.

The present exemplary embodiment of this invention provides a standardized print head control circuit which has a role determining circuit capable of selectively identifying a unique role (e.g. master or slave) which that particular print head control circuit is to perform with respect to data receipt and handling functions. By integrating such a role determining circuit within a standardized print head control circuit, only one type of circuit need be produced. This results in standarization of components (e.g. LSI chips) and an attendant reduction in costs and/or complexity of manufacture, repair, etc.

The exemplary embodiment provides a dot matrix print head control circuit which is capable of selectively requesting and receiving a print head control data set (e.g. a byte) from a digital data processor which successively transmits plural sets (e.g. bytes) of digital data in response to a data request signal. Each print head control circuit has a role determining circuit which establishes a predetermined master/slave relationship between each of the identical print head control circuits which, in turn, determines which circuit actually generates data request signals to the data source and which circuit actually receives each of the successively transmitted data sets (e.g. bytes). Typically a data request circuit is included to periodically generate a data request signal. This data request signal is input to the data source (e.g. a digital data processor) which, in response successively transmits plural sets (e.g. bytes) of digital print data.

A selected one of the control circuits is initially designated as the "master" while the remaining circuit is a "slave". The master control circuit then generates a data request signal to a microprocessor data source which, in the exemplary embodiment thereafter provides successive bytes of print data on a data bus system until the data request signal is terminated (e.g. in a direct memory access mode). The slave circuit is conditioned to accept only the first transmitted print data byte. The master circuit is conditioned to accept only the second transmitted print data byte and to then terminate the data request signal. The same technique could of course be analogously extended, if desired, for other print head configurations to a system having more than two identical control circuits which are initialized so as to take on a predetermined sequence of hierarchical priorities for successively accepting respectively corresponding successively transmitted print data bytes and with the last circuit to recieve data typically being the one "master" circuit that initiates and terminates the data request signal.

The exemplary role determining circuit includes a master/slave state means capable of being initially preset to one of plural predetermined states. A timing circuit is provided which is responsive to both the state of the master/slave state means and the data request signal. A control circuit within the role determining circuit is responsive to the state of the master/slave state means, the timing circuit and the data acknowledge pulses (from the microprocessor and accompanying each transmitted data byte) such that a predetermined one of a series of data acknowledge pulses is passed by the role determining circuitry while all the other data acknowledge pulses are blocked. The data acknowledge pulse which is passed through the role determining circuitry initializes a register within the print head control circuit to allow the register to select the proper set (e.g. byte) of digital data then being transmitted on the data bus by the digital data processor. Because each master/slave state means is preset to a different initial condition, each role determining circuit of each print head control circuit allows a different data acknowledge pulse to pass therethrough and initialize the register of that print head control circuit. In this way, the register of each print head control circuit is uniquely initialized so that the proper set of digital data is input to the register.

Thus the present invention allows a plurality of identical circuits to be initialized to select a predetermined proper set (e.g. byte) of digital data from among plural sets (e.g. bytes) of successively transmitted digital data. In response to the selected digital data byte, the associated print head control circuit is capable of performing a corresponding uniquely determined print function although utilizing the same circuitry.

These and other objects, advantages and features of the present invention will be better understood and appreciated from the following detailed description of the presently preferred embodiment taken in conjunction with the accompanying drawings, of which:

Figure 1:
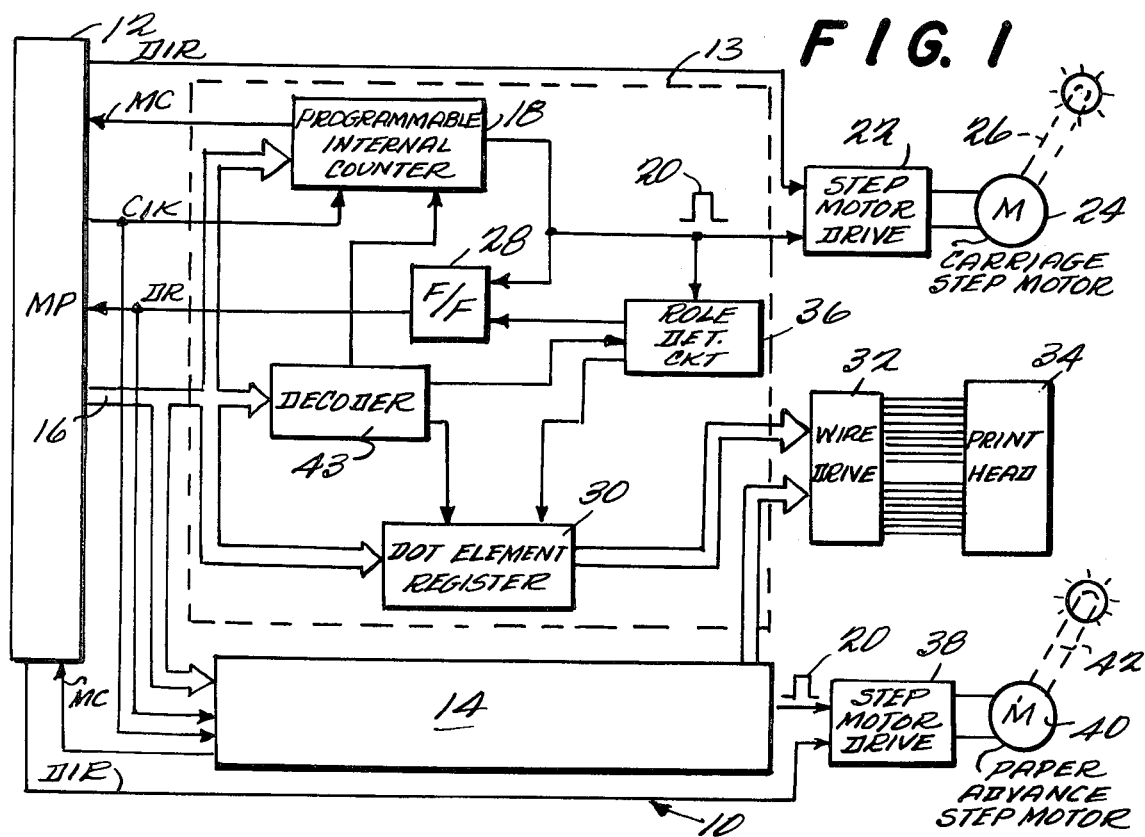
FIG. 1 is a block diagram illustrating an exemplary overall control system for a dot-matrix printer incorporating this invention.

The dot-matrix printer 10 of FIG. 1 includes a microprocessor 12, a first control circuit 13 (typically a large scale integration LSI chip) and a second, identical control circuit 14 (also typically a large scale integration LSI chip). Since each of the control circuits 13 and 14 are identical, relevant portions of only the first control circuit 13 are illustrated.

The microprocessor 12, the first control circuit 13 and the second control circuit 14 are conventionally interconnected by data bus 16. Each LSI chip 13, 14 typically contains a programmable interval counter 18. The programmable interval counter 18 produces variable frequency motion control pulses 20 which are input to a step motor drive circuit 22 to conventionally produce a desired motion profile for an output shaft 26 of the stepper motor 24. Details of the step motor drive circuit 22 are discussed in the above referenced copending U.S. patent application Ser. No. 399,129 (G.E. Docket No. 45-SL-01376).

By increasing, maintaining or decreasing the frequency of motion control pulses, the output shaft 26 of stepper motor 24, for example, may be made to accelerate, to maintain a constant speed or to decelerate, respectively, according to a predetermined velocity profile. Whenever the desired motion of the output shaft 26 has been commanded, the programmable interval counter 18 typically produces a motion complete signal MC which is input to the microprocessor 12 for conventional usage.

The motion control pulses 20 produced by the programmable interval counter 18 are, in the exemplary embodiment, also input as data request pulses to the microprocessor 12 through a flip-flop 28. The use of the motion control pulses to both control the motion of the stepper motor 24 and to request data from the microprocessor 12 is discussed in detail in my above-referenced copending U.S. patent application Ser. No. 399,130 (GE Docket No. 45-SL-01377).

Figure 2:
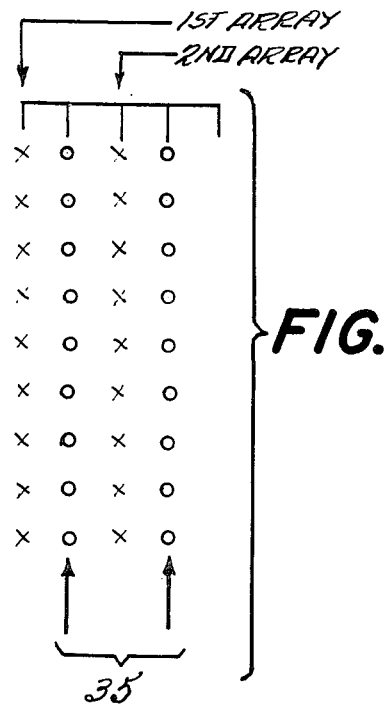
FIGS. 2 and 3 illustrate dot print patterns produced by an 18 wire print head having two vertical linear arrays of print wires.

Each of the chips 13 and 14 includes a dot elementt print data register 30 for receiving and temporarily storing a byte (e.g. 8 bits) of print data from the microprocessor 12. The print data byte is input to a conventional wire drive circuit 32 which selectively drives the individual wires of a print head 34. In FIG. 1, the print head illustrated is an eighteen wire print head which requires the dot element data registers 30 from both the chips 13 and 14 to provide sufficient stored dara to the wire drive circuits 32 for proper operation. The print head 34 typically produces dot print patterns such as those illustrated in FIGS. 2 and 3. In FIG. 2 the first column of X's represents nine positions on the paper which may be selectively struck by the wires of one vertical array on the print head. The positioning of the print head is such that the nine strike positions illustrated by the first column of X's may be repeated at the positions labeled 35. The first nine wires of the print head 34 are therefore responsible for printing columns each comprised of nine potential strike positions.

The second array of nine wires of the print head 34 are located such that their strike positions, illustrated by the second column of X's in FIG. 2, are horizontally intermediate of the strike positions of the first nine wires of the print head 34. In this configuration, it is possible to increase the horizontal density of the printed dots.

Figure 3:
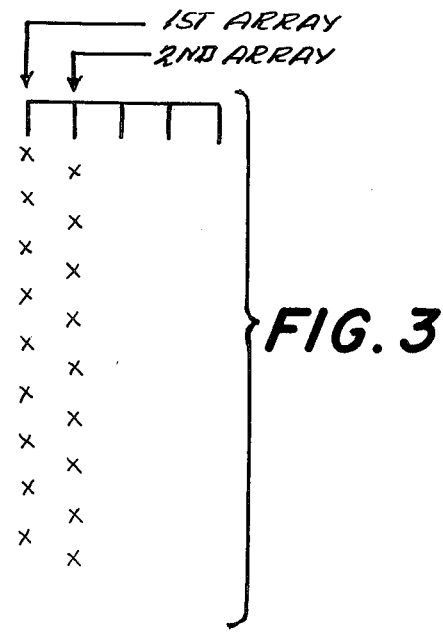

FIG. 3 illustrates another possible plural print wire array pattern for the print head 34. In FIG. 3 the first column of X's represents the potential strike positions produced by the first nine wire array while the second column of X's represents the potential strike positions produced by the second nine wires. In this configuration, the strike positions caused by the second nine wire array are vertically intermediate of the strike positions for the first nine wire array. Thus, in this configuration, the vertical density of the printed material is increased. Other possible configurations of plural print wire arrays in a given print head are also possible as will be appreciated.

A role determining circuit 36 is provided in each of the chips 13 and 14. The purpose of the role determining circuit 36 is to identify the master or slave role which each of the chips 13, 14 is to perform with respect to print data requests and data receipts. In an embodiment where only two chips are utilized, one chip will be designated a master and the other a slave. This identification of roles is necessary since the microprocessor 12 typically successively outputs plural sets (e.g. bytes) of digital data in response to a continuing data request signal (e.g. in a direct memory access mode). Each of the chips 13 and 14 must be initialized so as to accept only the proper set (e.g. byte) of digital data. The operation of the role determining circuit 36 and its function of coordinating control between the two identical chips 13 and 14 is an important feature of the present invention and will now be described in detail in conjunction with FIGS. 1 and 4.

The programmable interval counter 18 produces motion control pulses 20 which are input to a step motor drive circuit 22 to control the angular displacement of an output shaft 26 of a first step motor 24. The step motor drive circuit 38 is identical in structure and function to the stepper motor drive 22 and produces similar control signals to control step motor 40. In order to fully utilize the capabilities of the chips 13, 14 the step motor 24 may typically be utilized to control carriage motion while the step motor 40 may be used to control paper advance motion.

The microprocessor-based control system illustrated in FIG. 1 is completed by a decoder 43 which is connected to the microprocessor 12 through the data bus 16. The decoder 43 may be a conventional address decoder provided external to chips 13, 14 and it operates in a conventional manner to selectively address components within the chip 13 to enable them to selectively receive data from the data bus 16. For example, the decoder permits the identical circuits to be selectively initialized to unique master slave conditions. Finally, a system clock signal CLK is typically input to the various components of the chip 13 to enable synchronization of data transfers and the like. (The chips 13 and 14 are designed in one exemplary embodiment to be clocked at a three megahertz frequency.)

The chips 13, 14 preferably include all the necessary logic to control the print action of the dot-matrix print head 34 and the motion of the carriage step motor 24 or paper step motor 40. These chips are designed for standard microprocessor input/output interface, including direct memory access (DMA) and interrupt capability. A major feature of the dot-matrix printer 10 shown in FIG. 1 is that the chips 13, 14 contain sufficient flexibility for use with any number of step motor driven print mechanisms with no special restrictions imposed on the controlling microprocessor 12. The chips 13 and 14 control movement of the printer carriage (via step motor 24) while synchronizing the dot-matrix print action with the carriage motion, coordinate data transfer from the microprocessor's memory to the wire drive 32 by direct memory access and control the paper advance (via step motor 40). Although the chips 13, 14 are identical, the operation of the role determining circuit 36 enables the identically constructed chips to perform different print head control operations.

In dot-matrix printer 10, direct memory access is typically provided by the processor DMA controller for transferring print data bytes. A data request is made when print data is required and successive data bytes (via the data bus 16) and accompanying data acknowledge strobe signals (via a data acknowledge control line) are transmitted by microprocessor 12 until the data request signal is terminated. Upon receipt of each data strobe the contents of the selected memory location are input to respective dot element print data registers via the data bus. Print wires are then substantially immediately actuated in accordance with the supplied print data byte pattern. (It is here assumed that the DMA time is short and does not contribute significant delay to the print action.)

In dot matrix printer 10 utilizing two identical chips 13, 14 as shown in FIG. 1 (which in the exemplary embodiment drive a print head containing two or more print wire arrays), provisions are made to make two DMA transfers per print element. For example, by initially setting a double action register in the chip, the designated master print head control circuit responds only to the second data acknowledge strobe, while the slave print head control circuit will respond only to the first data acknowledge strobe. It is assumed that the time between the two data transfer cycles will be too short to cause significant time-induced differences in dot placement.

Figure 4:
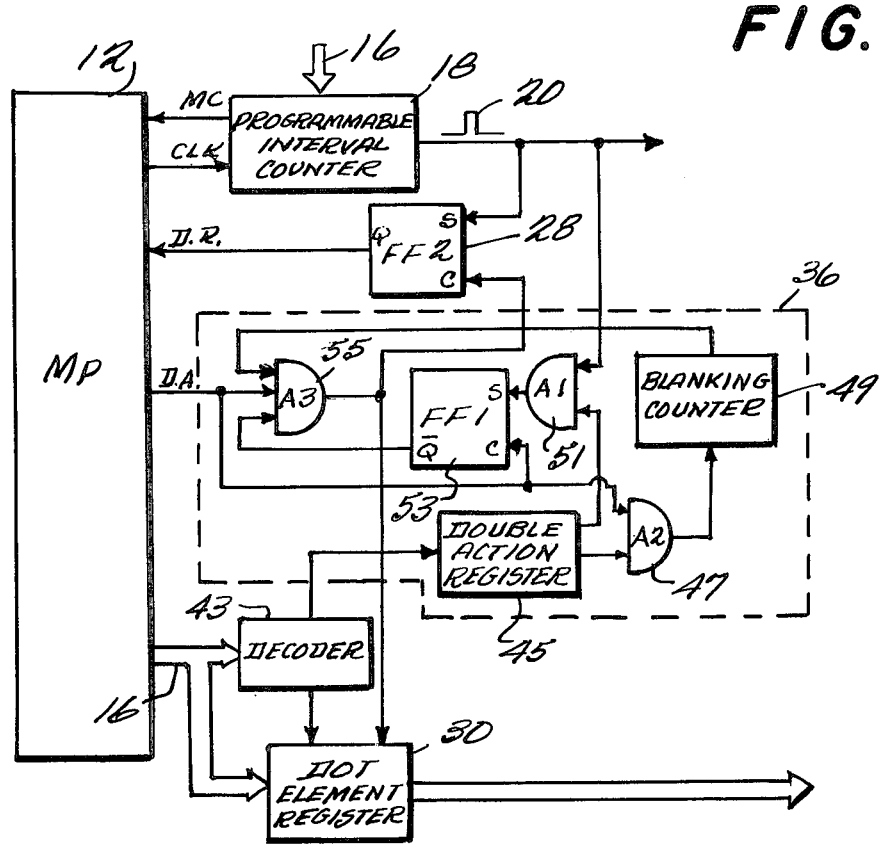
FIG. 4 is an electrical schematic illustrating the details of the role determining circuit of FIG. 1.

The role determining circuit 36 is illustrated in detail in FIG. 4. The role determining circuit 36 includes a double action register 45 which is initially set (e.g. by the microprocessor 12 through the decoder 43) to indicate the predetermined role which the chip is to perform. In an embodiment as shown in FIG. 1 where there are only two chips, the double action register may include a single, conventional flip-flop and one chip is designated to perform a master role while the other performs a slave role. AND gate 47 (A2) is responsive to both the data acknowledge pulses DA produced by the microprocessor 12 and the double action register 45. A blanking counter 49, which may include two conventional flip-flops, is controlled (e.g. started) by the output of the AND gate 47 (A2).

AND gate 51 (A1) is responsive to both the double action register 45 and the motion control pulses 20. A flip-flop 53 (FF1) is set by the output of AND gate 51 (A1) and is cleared by the data acknowledge pulses DA. Finally, AND gate 55 (A3) is responsive to a $\bar{Q}$ output of the flip-flop 53, the data acknowledge pulses DA of the microprocessor 12 and an output of the blanking counter 49.

Figure 5:
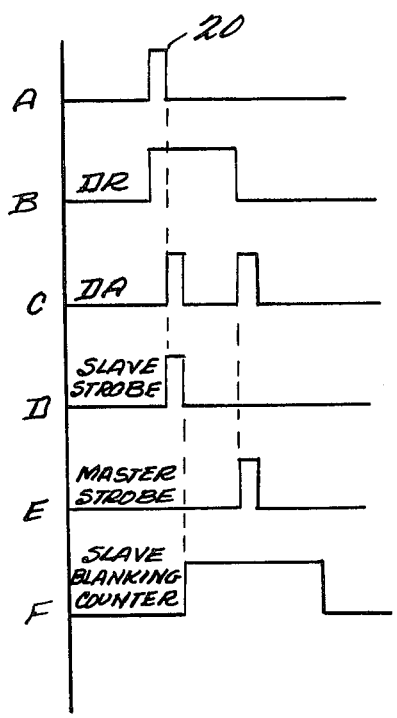
FIG. 5 illustrates signal timing diagrams for the role determining circuit of FIG. 4.

In the DMA mode, microprocessor 12 typically produces data bytes and accompanying acknowledge pulses DA in quick succession as shown in FIG. 5 at C. Depending upon the initialization of the double action register 45 the first of the data acknowledge pulses will be inhibited (in the "master" chip) and the second will be passed by the AND gate 55 (A3) to provide a strobe signal to the dot element print data register as shown in FIG. 5 at E. The reverse is true for the slave chip. That is, in the "slave" chip, the first data acknowledge pulse will be passed by the AND gate 55 (A3) to provide a strobe for the dot element print data register 30 while the second data acknowledge pulse will be inhibited. The operation of the role determining circuit 36 to provide this function will now be described in detail.

The double action register 45 is initially set to a unique status by the microprocessor 12 via the data bus 16 and decoder 43 to correspond to either a master or a slave role. Whenever a motion control pulse 20 is produced (see FIG. 5 at A), it is input to set the flip-flop 28 (FF2). This causes the Q output terminal of the flip-flop 28 (FF2) to initiate a data request signal DR (shown in FIG. 5 at B), which is input to the microprocessor 12. In response to the data request signal DR, the microprocessor 12 thereafter produces data bytes (on the data bus) and accompanying data acknowledge pulses DA in quick succession. If the chip has been designated by the microprocessor 12 to perform a master role, the double action register 45 enables gate 51 (A1) such that the motion control pulse 20 has itself previously set flip-flop 53 (FF1). The flip-flop 53 (FF1) then disables gate 55 (A3) so that first data acknowledge pulse DA (shown in FIG. 5 at C), will not pass through the gate 55 (A3). However, this first data acknowledge pulse will nevertheless clear the flip-flop 53 (FF1) such that gate 55 (A3) thereafter is enabled. Thus, the second of the data acknowledge pulses is passed by the gate 55 (A3) to strobe the dot element print data register 30 and to clear the data request flip-flop 28 (FF2) thus terminating data transmissions.

In this manner, the double action register 45, when set to a master role, causes the role determining circuit 36 to accept only the second transmitted data byte and accompanying data acknowledge pulse. When the chip is designated for a slave role, double action register 45 does not initially enable the gate 51 (A1). Thus, the flip-flop 53 (FF1) does not disable the gate 55 (A3) and the first transmitted data acknowledge pulse DA is permitted to pass through the gate 55 (A3) and to act as the strobe for the dot element print data register 30. Flip-flop 28 (FF2) is also cleared by the first DA pulse. However, the double action register 45, when set to the slave role, does enable AND gate 47 (A2) such that the first data acknowledge pulse DA is passed through gate 47 (A2) to start the blanking counter 49 which times out after a predetermined time period (as illustrated by FIG. 5 at F. During this period, blanking counter 49 disables AND gate 55 (A3) such that the second transmitted data acknowledge pulse DA is inhibited by gate 55 (A3). The blanking timer 49 preferably times out only well after the second data acknowledge pulse DA. In this manner, the one-time unique initialization of the double action register 45 enables identical chips 13 and 14 to thereafter uniquely respond to predetermined ones of plural successively transmitted sets (e.g. bytes) of digital data.

In summary, two identical chips are used to independently drive two wire arrays in a dot matrix print head. The microprocessor 12 initializes one of the chips to perform a master role so that it issues a data request signal while the second chip is left to perform a slave role by simply responding the data it first receives in response to such request. The master chip then responds to the next byte of received data and also terminates the data request signal. The microprocessor 12 in the exemplary embodiment issues bytes of data in quick succession in response to a single prolonged data request signal in a DMA mode. Routing of two such successive bytes to their respective wire drivers is handled by the chips as just described. Typically each chip also includes step motor control circuits. Thus, when used in a printer having a dual array print head, maximum circuit utilization can be achieved by having one master chip control one print head wire array and one step motor (e.g. the print head carriage motor) and another identical slave chip control the other print head wire array and another step motor (e.g. the paper advance motor). Because of the role determining circuit which enables the two identical chips to perform different functions, maximum flexibility and maximum use of the components within each chip is possible.

The description of the presently preferred exemplary embodiment is intended only for purposes of illustration and not limitation. It is anticipated that many variations and modifications may be made in this exemplary embodiment while still retaining some or all of the novel advantages and features of this invention. All such variations and modifications are intended to be included in the scope of the appended claims.

What is claimed is:

1. A dot matrix printer head control circuit capable of selectively requesting and receiving print head control data from a digital data processor which successively transmits plural sets of digital data in response to a data request signal, said control circuit comprising:
    master/slave state means capable of being preset to one of plural predetermined stable states;
    data request means connected to said master/slave state means for generating a data request signal only if said master/slave state means has been preset to the predetermined master stable state; and
    data receiving means also connected to said master/slave state means for receiving only a predetermined one of the successive sets of digital data transmitted in response to a given data request signal, said predetermined set being determined by the preset stable state of said master/slave state means.

2. A dot matrix printer head control circuit as in claim 1 wherein said digital data processor also transmits a data acknowledge control pulse associated with each set of said transmitted digital data and wherein said data receiving means comprises:
    a data register connected to receive and store one set of said transmitted digital data when activated by an associated control signal; and
    control means connected to receive said data acknowledge control pulses and to generate said associated control pulse for the data register in response to a predetermined one of said data acknowledge control pulses as determined by the state of said master/slave state means.

3. A dot matrix printer head control circuit capable of selectively requesting and receiving print head control data from a digital data processor which successively transmits plural sets of digital data in response to a data request signal, said control circuit comprising:
    master/slave state means capable of being preset to one of plural predetermined states;
    data request means for generating a data request signal;
    data receiving means connected to said master/slave state means for receiving a predetermined one of the successive sets of digital data transmitted in response to a given data request signal, said predetermined set being determined by the state of said master/slave state means;
    wherein said digital data processor also transmits a data acknowledge control pulse associated with each set of said transmitted digital data and wherein said data receiving means comprises:
        a data register connected to receive and store one set of said transmitted digital data when activated by an associated control signal; and
        control means connected to receive said data acknowledge control pulses and to generate said associated control pulse for the data register in response to a predetermined one of said data acknowledge control pulses as determined by the state of said master/slave state means; and
    wherein said control means comprises:
        flip-flop means which is set to a first state concurrently with the generation of said data request signal only if the master/slave state means has been preset to a master state and which is reset to a second state in response to said data acknowledge control pulses;
        blanking timer means activated for a predetermined time in response to said data acknowledge pulses unless inhibited by said master/slave means being preset to a master state; and
        gate means connected to receive said data acknowledge control pulses and to pass same only when said flip-flop means resides in a predetermined state and said blanking timer resides in a predetermined state.

4. A dot matrix printer head control circuit as in claim 3 wherein:
    said flip-flop means comprises a flip-flop having a first logic gate connected to control one of its state-defining inputs and its other state-defining input connected to be controlled by said data acknowledge control pulses, said first logic gate being responsive to the state of said master/slave state means and to the generation of said data request signal;
    said blanking timer means comprises a clock-driven counter and a second logic gate connected to activate said counter in response to the state of said master/slave state means and to said data acknowledge control pulses; and
    said gate means comprises a third logic gate having inputs connected to receive said data acknowledge control pulses, an output of said flip-flop and an output of said counter, said third logic gate having an output connected to provide said associated control signal to said data register.

5. A dot matrix printer head control circuit as in claim 4 wherein said data request means comprises:
    an interval counter for periodically generating an interval pulse which is supplied as an input to said first logic gate; and
    a second flip-flop having one of its state-determining inputs connected to receive said interval pulse and another of its state-determining inputs connected to receive the output of said third logic gate, said second flip-flop providing as an output said data request signal.

6. A role determining circuit for establishing a predetermined relationship between two identical data receiving circuits each having means capable of receiving data and associated data acknowledge pulses successively transmitted from a data processor in response to a data request signal, each data receiving circuit having a role determining circuit comprising:

state means capable of being initialized to represent one of plural predetermined stable states; and control means responsive to the initialized stable state of said state means such that (1) if initialized to a master state then a first-occurring data acknowledge pulse after production of a data request signal is inhibited by said state means while a second-occurring data acknowledge pulse is passed to said data receiving means of its associated data receiving circuit to cause storage of the digital data associated with the second data acknowledge pulse, and (2) if initialized to a slave state then said first-occurring data acknowledge pulse is transmitted to said data receiving means of its associated data receiving circuit and said second-occurring data acknowledge pulse is inhibited by the state means.

7. The role determining circuit of claim 6 wherein each means for receiving data includes a dot element print data register for a dot matrix printer.

8. The role determining circuit of claim 6 wherein the state means includes a flip-flop.

9. The role determining circuit of claim 6 or 7 further including a logic gate responsive both to the state means and to the data acknowledge pulses and further including a timing means responsive to the output of said logic gate, the output of said timing means being input to the control means.

10. A role determining circuit for establishing a predetermined relationship between two identical data receiving circuits each having means capable of receiving data and associated data acknowledge pulses successively transmitted from a data processor in response to a data request signal, each data receiving circuit having a role determining circuit comprising:

state means capable of being initialized to represent one of plural predetermined states;

control means responsive to the initialized state of said state means such that (1) if initialized to a master state then a first-occurring data acknowledge pulse after production of a data request signal is inhibited by said state means while a second-occurring data acknowledge pulse is passed to said data receiving means of its associated data receiving circuit to cause storage of the digital data associated with the second data acknowledge pulse, and (2) if initialized to a slave state then said first-occurring data acknowledge pulse is transmitted to said data receiving means of its associated data receiving circuit and said second-occurring data acknowledge pulse is inhibited by the state means;

wherein each means for receiving data includes a dot element print data register for a dot matrix printer; and a logic gate responsive both to the state means and to the data acknowledge pulses and further including a timing means responsive to the output of said logic gate, the output of said timing means being input to the control means;

wherein the control means includes a logic gate responsive both to the state means and to the data request signal and further including a flip-flop that is set to one state by said logic gate and cleared to its other state by a preselected one of said data acknowledge pulses.

11. The role determining circuit of claim 10 wherein the control means further includes a second logic gate responsive to the flip-flop, to the timing means and to the data acknowledge pulses for selectively passing one of the first and second data acknowledge pulses.

12. A dot matrix printer including two substantially identical, addressable print data receiving circuits having a dot element register capable of receiving print data for an associated print wire array from a data processor upon being set by a concurrent data acknowledge pulse received from the data processor, each identical circuit comprising:

a first flip-flop initialized to indicate one of a master and a slave role;

a blanking timer means activated to provide a timed output in response to a predetermined state of said first flip-flop and the occurrence of said data acknowledge pulses;

a second flip-flop set to one state by said first flip-flop and cleared to its other state by said data acknowledge pulses; and a logic gate responsive to said second flip-flop, to said blanking timer means output and to said data acknowledge pulses such that (1) a first data acknowledge pulse is inhibited by said first flip-flop and clears said second flip-flop thereby allowing a second data acknowledge pulse to be transmitted to said dot element register of a master designated circuit, and (2) said first data acknowledge pulse is transmitted to said dot element register of a slave designated circuit and activates the blanking timer means thereby inhibiting said second data acknowledge pulse from clearing the second flip-flop of the slave designated circuit.

13. A dot matrix printer as in claim 12 including a second logic gate responsive to both the first flip-flop and the data acknowledge pulses for activating the blanking timing means.

14. A dot matrix printer as in claim 12 including an motor motion controlling interval counter and a third logic gate responsive to both said interval counter and the first flip-flop, and wherein the second flip-flop is set to one of its states by said third gate.

15. A dot matrix printer as in claim 14 including a third flip-flop set to one of its states by the interval counter and cleared to the other of its states by the data acknowledge pulses selectively passed by the first mentioned logic gate, said third flip-flop producing data request pulses for input to the data processor.

* * * * *